(12) United States Patent
Chu et al.

(10) Patent No.: US 12,253,775 B2
(45) Date of Patent: Mar. 18, 2025

(54) DISPLAY PANEL AND DISPLAY APPARATUS

(71) Applicant: Shanghai Tianma Microelectronics Co., Ltd., Shanghai (CN)

(72) Inventors: Dandan Chu, Shanghai (CN); Xiaodong Yang, Shanghai (CN); Ye Yan, Shanghai (CN); Jiandong Wang, Shanghai (CN); Xiongping Li, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/659,229

(22) Filed: May 9, 2024

(65) Prior Publication Data

US 2024/0288727 A1    Aug. 29, 2024

(30) Foreign Application Priority Data

Sep. 27, 2023  (CN) .......................... 202311273678.2

(51) Int. Cl.
| | |
|---|---|
| *G02F 1/1362* | (2006.01) |
| *G02F 1/1335* | (2006.01) |
| *G02F 1/1343* | (2006.01) |

(52) U.S. Cl.
CPC .. *G02F 1/136222* (2021.01); *G02F 1/133512* (2013.01); *G02F 1/133514* (2013.01); *G02F 1/134363* (2013.01); *G02F 1/136209* (2013.01); *G02F 1/136227* (2013.01); *G02F 1/136286* (2013.01)

(58) Field of Classification Search
CPC ......... G02F 1/136222; G02F 1/133512; G02F 1/134363; G02F 1/136209
See application file for complete search history.

(56) References Cited

U.S. PATENT DOCUMENTS

| | | | | |
|---|---|---|---|---|
| 2017/0023839 | A1* | 1/2017 | Han | ................... H01L 27/1244 |
| 2024/0176195 | A1* | 5/2024 | Morimoto | ......... G02F 1/133711 |

FOREIGN PATENT DOCUMENTS

| | | |
|---|---|---|
| CN | 204129400 U | 1/2015 |
| CN | 104656333 A | 5/2015 |
| CN | 113140575 A | 7/2021 |

\* cited by examiner

*Primary Examiner* — Jessica M Merlin

(74) *Attorney, Agent, or Firm* — CHRISTENSEN O'CONNOR JOHNSON KINDNESS PLLC

(57) ABSTRACT

A display panel and display apparatus, display panel includes an array substrate. Array substrate includes substrate and has display region. Display region includes color filter, pixel electrode, and first transistor that are located on same side of substrate. First transistor includes first semiconductor layer. Along direction perpendicular to plane of substrate, color filter is located between first semiconductor layer and pixel electrode, and first semiconductor layer is electrically connected to pixel electrode through first connecting portion. First connecting portion includes first connecting sub-portion in first connecting hole. Orthographic projection of first connecting sub-portion on plane of substrate does not overlap with orthographic projection of color filter on plane of substrate. Along direction parallel to plane of substrate, first connecting sub-portion at least partially overlaps with color filter. Or, along direction perpendicular to plane of substrate, first semiconductor layer and pixel electrode are located on same side of color filter.

11 Claims, 13 Drawing Sheets

DISPLAY PANEL AND DISPLAY APPARATUS

CROSS-REFERENCE TO RELATED DISCLOSURE

The present disclosure claims priority to Chinese Patent Application No. 202311273678.2, filed on Sep. 27, 2023, the content of which is incorporated herein by reference in its entirety.

TECHNICAL FIELD

The present disclosure relates to the technical field of displays, and in particular to a display panel and a display apparatus.

BACKGROUND

With constant development of display technologies, thin film transistor liquid crystal displays (TFT-LCD) play a leading role in the field of flat panel displays for its small size, low power consumption, no radiation, etc.

The TFT-LCD includes a pixel electrode and a transistor that are electrically connected. At present, a through hole is formed in a color filter, such that the pixel electrode and the transistor at two sides of the color filter are electrically connected. The manufacturing process of the through hole is difficult, and does not facilitate miniaturization of a sub-pixel.

SUMMARY

In view of this, embodiments of the present disclosure provide a display panel and a display apparatus. While realizing an effect that a pixel electrode is electrically connected to a corresponding transistor, the present disclosure does not form a hole in a color filter.

In an aspect, the present disclosure provides a display panel, including an array substrate. In an embodiment, the array substrate includes a substrate. In an embodiment, the array substrate is provided with a display region. In an embodiment, the display region includes a color filter, a pixel electrode, and a first transistor that are located on a same side of the substrate. In an embodiment, the first transistor includes a first semiconductor layer. In an embodiment, along a direction perpendicular to a plane of the substrate, the color filter is located between the first semiconductor layer and the pixel electrode, and the first semiconductor layer is electrically connected to the pixel electrode through a first connecting portion. In an embodiment, the first connecting portion includes a first connecting sub-portion in a first connecting hole. In an embodiment, an orthographic projection of the first connecting sub-portion on the plane of the substrate does not overlap with orthographic projection of the color filter on the plane of the substrate. In an embodiment, along a direction parallel to the plane of the substrate, the first connecting sub-portion at least partially overlaps with the color filter. In an embodiment, along the direction perpendicular to the plane of the substrate, the first semiconductor layer and the pixel electrode are located on a same side of the color filter.

According to another aspect, an embodiment of the present disclosure provides a display apparatus including a display panel, and the display panel includes an array substrate. In an embodiment, the array substrate includes a substrate. In an embodiment, the array substrate is provided with a display region. In an embodiment, the display region includes a color filter, a pixel electrode, and a first transistor that are located on a same side of the substrate. In an embodiment, the first transistor includes a first semiconductor layer. In an embodiment, along a direction perpendicular to a plane of the substrate, the color filter is located between the first semiconductor layer and the pixel electrode, and the first semiconductor layer is electrically connected to the pixel electrode through a first connecting portion. In an embodiment, the first connecting portion includes a first connecting sub-portion in a first connecting hole. In an embodiment, an orthographic projection of the first connecting sub-portion on the plane of the substrate does not overlap with orthographic projection of the color filter on the plane of the substrate. In an embodiment, along a direction parallel to the plane of the substrate, the first connecting sub-portion at least partially overlaps with the color filter. In an embodiment, along the direction perpendicular to the plane of the substrate, the first semiconductor layer and the pixel electrode are located on a same side of the color filter.

BRIEF DESCRIPTION OF DRAWINGS

To describe the technical solutions in the embodiments of the present disclosure more clearly, the following briefly describes the accompanying drawings required to be used in the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

For the sake of a better understanding of the technical solutions of the present disclosure, the embodiments of the present disclosure are described in detail below with reference to the accompanying drawings.

It should be noted that the embodiments in the following descriptions are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

It is to be understood that terms such as first, second and third in the embodiments of the present disclosure are merely used to distinguish similar objects, rather than describe a particular sequence.

Figure 1:
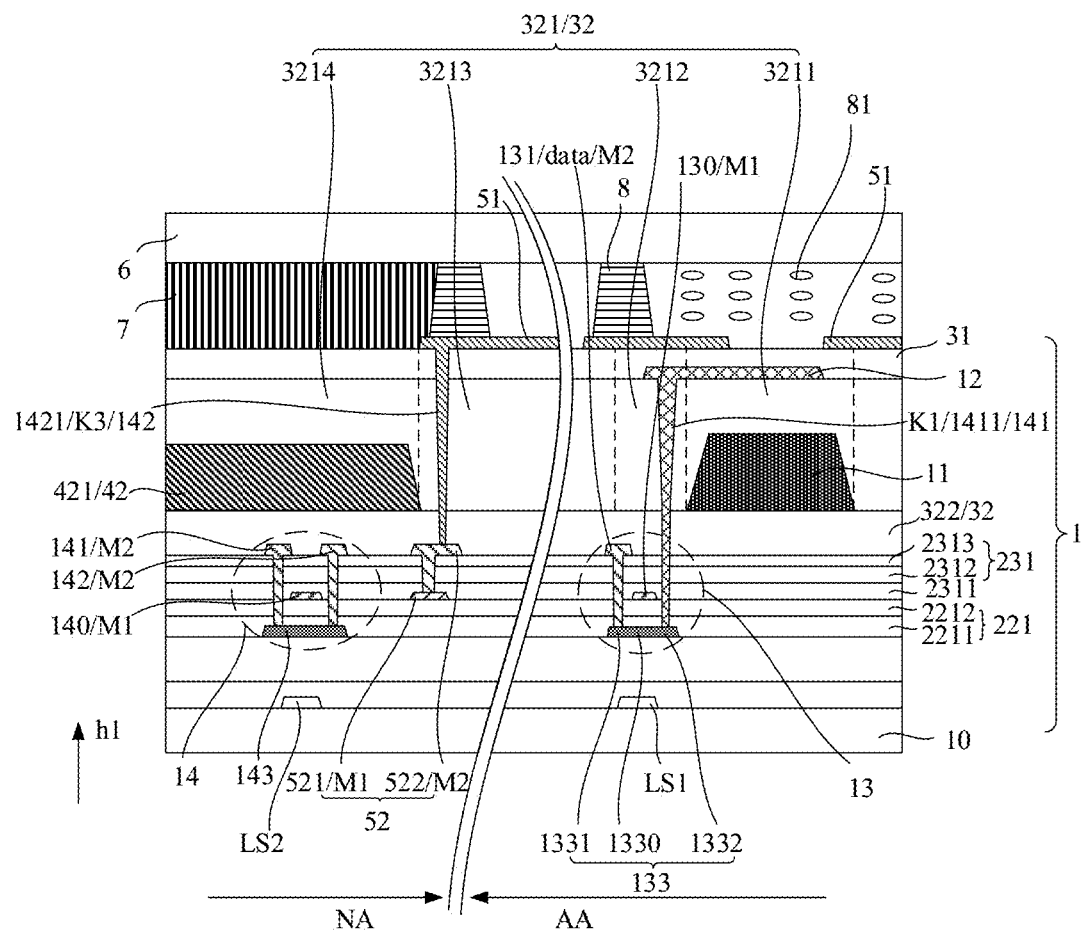
FIG. 1 is a schematic cross-sectional view of a display panel according to an embodiment of the present disclosure.
Figure 2:
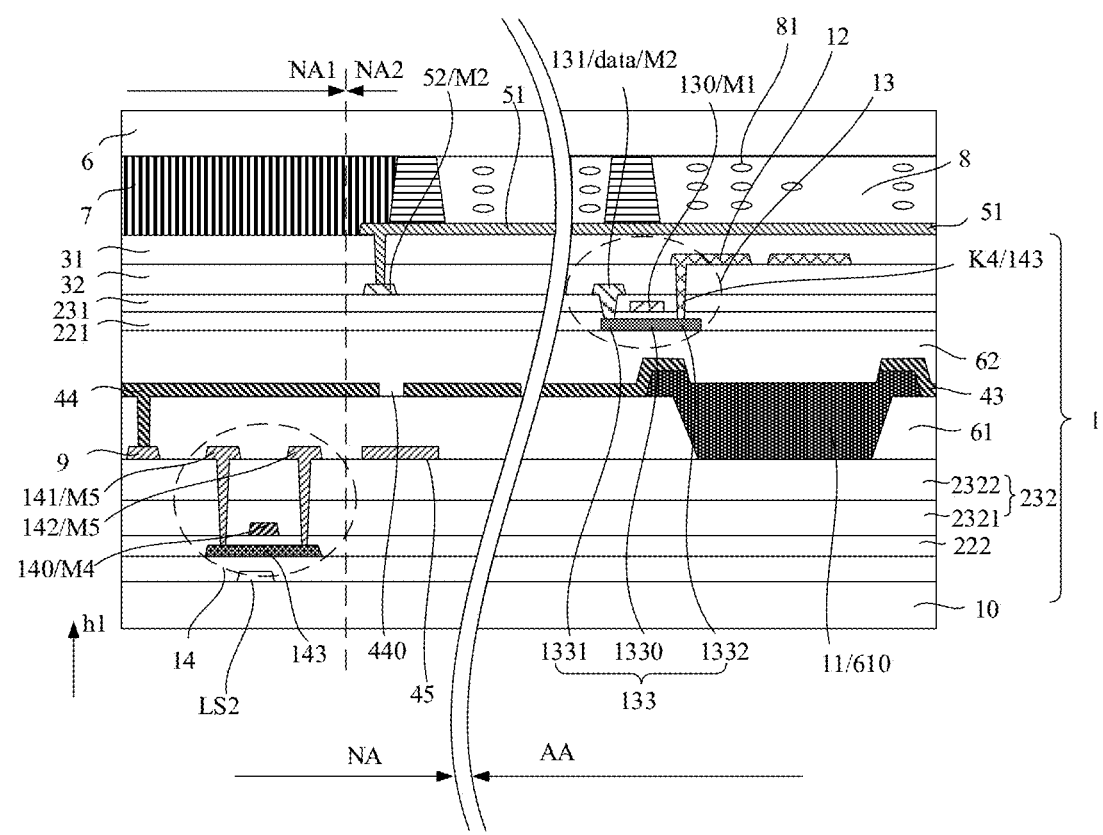
FIG. 2 is a schematic cross-sectional view of another display panel according to an embodiment of the present disclosure.

In an aspect, the present disclosure provides a display panel. FIG. 1 and FIG. 2 are respectively schematic cross-sectional views of two display panels according to the embodiment of the present disclosure. As shown in FIG. 1 and FIG. 2, the display panel includes an array substrate 1. The array substrate 1 is provided with a display region AA and a non-display region NA. Specifically, the array substrate 1 includes a substrate 10. The substrate 10 includes a display region AA and a non-display region NA. The non-display region NA at least partially surrounds the display region AA. The display region AA includes a color filter 11, a pixel electrode 12, and a first transistor 13 that are located on a same side of the substrate 10. The first transistor 13 is electrically connected to the pixel electrode 12. Specifically, as shown in FIG. 1, the first transistor 13 includes a first gate 130 and a first semiconductor layer 133. The first semiconductor layer 133 includes a channel region 1330, a first doped region 1331, and a second doped region 1332. The first doped region 1331 is electrically connected to a data line. The second doped region 1332 is electrically connected to the pixel electrode 12. As shown in FIG. 1, orthographic projection of the first gate 130 on a plane of the substrate 10 overlaps with orthographic projection of the channel region 1330 on the plane of the substrate 10.

In an embodiment of the present disclosure, as shown in FIG. 1, along a direction h1 perpendicular to the plane of the substrate 10, the color filter 11 may be provided between the first semiconductor layer 133 and the pixel electrode 12. The first semiconductor layer 133 is electrically connected to the pixel electrode 12 through a first connecting portion 141. As shown in FIG. 1, the first connecting portion 141 includes a first connecting sub-portion 1411 in a first connecting hole K1. Orthographic projection of the first connecting sub-portion 1411 on the plane of the substrate 10 does not overlap with orthographic projection of the color filter 11 on the plane of the substrate 10. In an embodiment of the present disclosure, the first connecting sub-portion 1411 in the first connecting hole K1 and the pixel electrode 12 may be made of a same material and formed in a same process. Along a direction parallel to the plane of the substrate 10, the first connecting sub-portion 1411 at least partially overlaps with the color filter 11. In FIG. 1, the first connecting sub-portion 1411 is thicker than the color filter 11, and along the direction parallel to the plane of the substrate 10, the first connecting sub-portion 1411 includes one part overlapping with the color filter 11, and the other part not overlapping with the color filter 11.

Or, as shown in FIG. 2, along the direction h1 perpendicular to the plane of the substrate 10, the first semiconductor layer 133 and the pixel electrode 12 are located on a same side of the color filter 11.

Exemplarily, the display panel may be a liquid crystal display (LCD) panel. The display panel may be cooperatively provided with a backlight module (not shown). The color filter 11 is located at a light exit side of the backlight module. As shown in FIG. 1 and FIG. 2, the display panel further includes a common electrode 51 and a liquid crystal layer 81. The liquid crystal layer 81 is located at a side of the pixel electrode 12 away from the substrate 10. In response to display of the display panel, the first transistor 13 is turned on under the control of the first gate 130. The pixel electrode 12 receives a data voltage of the data line through the first transistor 13. The common electrode 51 receives a common voltage. Under an action of an electric field between the pixel electrode 12 and the common electrode 51, liquid crystal molecules in the liquid crystal layer 81 deflect at a particular angle, to adjust a transmittance of light rays from the backlight module. Moreover, after passing through the color filter 11, the light rays from the backlight module can be emitted at a particular color, such that corresponding sub-pixels are turned on according to required colors.

According to the display panel provided by the embodiment of the present disclosure, the array substrate 1 includes the color filter 11. In response to manufacturing of the display panel, the color filter 11 and the first transistor 13 are successively provided at a same side of the substrate 10. That is, both the color filter 11 and the first transistor 13 can be integrated into the array substrate 1. Compared with a solution in which the color filter 11 and the first transistor 13 are respectively provided on different substrates to form a color filter base including the color filter 11 and a driver base including the first transistor 13, and then the color filter base and the driver base are aligned to form the display panel, the technical solutions In an embodiment of the present disclosure can achieve a higher alignment accuracy, can reduce problems such as light leakage caused by an alignment deviation, and improves a product yield.

Moreover, the smaller the size of the sub-pixel, the higher the requirement on the alignment accuracy. According to the solutions provided by the embodiment of the present disclosure, the color filter 11 is provided in the array substrate 1. While ensuring the yield of the display panel, this can make the sub-pixel smaller, increases a number of pixels per inch (PPI) in the display panel, and realizes the high-resolution display panel. For example, the display panel provided by the embodiment of the present disclosure can be used in a VR display product.

In addition, as shown in FIG. 1, along the direction h1 perpendicular to the plane of the substrate 10, the orthographic projection of the first connecting sub-portion 1411 on the plane of the substrate 10 does not overlap with the orthographic projection of the color filter 11 on the plane of the substrate 10. Or, as shown in FIG. 2, along the direction perpendicular to the plane of the substrate 10, the first semiconductor layer 133 and the pixel electrode 12 are located on a same side of the color filter 11. While ensuring that the first semiconductor layer 133 and the pixel electrode 12 are electrically connected, this does not form a via hole in the color filter 11 to connect the pixel electrode 12 and the first semiconductor layer 133. The thicker the color filter 11, the more difficult the formation of the via hole, and the larger the area required by the via hole. Therefore, the technical solutions provided by the embodiment of the present disclosure can reduce a process difficulty of electrical connection between the first semiconductor layer 133 and the pixel electrode 12. Furthermore, if the via hole is formed in the color filter 11, the via hole cannot be too small due to process limitations. Accordingly, the area of the color filter 11 also cannot be too small, and this is far from satisfactory to the requirement of the high-resolution display panel. While the first semiconductor layer 133 and the pixel electrode 12 are electrically connected, the technical solutions provided by the embodiment of the present disclosure can make the color filter 11 small enough, thereby further meeting the design requirement of the high-resolution display panel.

Exemplarily, as shown in FIG. 1 and FIG. 2, the array substrate 1 further includes a first conductive layer M1 and a second conductive layer M2. The first conductive layer M1 includes the first gate 130 of the first transistor 13. The second conductive layer M2 includes a first terminal 131 of the first transistor 13. The first terminal 131 is electrically connected to the data line. The first terminal 131 includes a source or a drain. Exemplarily, the first transistor includes a P-type transistor or an N-type transistor.

Optionally, the first conductive layer M1 or the second conductive layer M2 includes a metal layer.

In FIG. 1 and FIG. 2, the first conductive layer M1 is located at a side of the first semiconductor layer 133 away from the substrate 10, and the second conductive layer M2 is located at a side of the first conductive layer M1 away from the first semiconductor layer 133. Optionally, as shown in FIG. 1 and FIG. 2, the array substrate 1 further includes a first gate insulating layer 221 and a first interlayer dielectric layer 231. The first gate insulating layer 221 is located between the first semiconductor layer 133 and the first conductive layer M1. The first interlayer dielectric layer 231 is located between the first conductive layer M1 and the second conductive layer M2.

Exemplarily, as shown in FIG. 1 and FIG. 2, the array substrate 1 further includes a first electrode insulating layer 31 and a second electrode insulating layer 32. The first electrode insulating layer 31 is located between the common electrode 51 and the pixel electrode 12. The second electrode insulating layer 32 is located between the pixel electrode 12 and the second conductive layer M2.

Optionally, as shown in FIG. 1, the color filter 11 may be provided at a side of the second conductive layer M2 away from the first conductive layer M1. Exemplarily, as shown in FIG. 1, the second electrode insulating layer 32 includes a first electrode insulating sub-layer 321 and a second electrode insulating sub-layer 322 that are stacked. The first electrode insulating sub-layer 321 is located between the color filter 11 and the pixel electrode 12. The second electrode insulating sub-layer 322 is located between the color filter 11 and the second conductive layer M2. Optionally, the first electrode insulating sub-layer 321 includes a planarization layer, to improve a flatness on a surface of the first electrode insulating sub-layer 321, thereby improving a manufacturing yield of the pixel electrode 12 on the surface of the first electrode insulating sub-layer 321.

Exemplarily, the first connecting hole K1 may penetrate through all insulating layers between the first semiconductor layer 133 and the pixel electrode 12. As shown in FIG. 1, the first connecting hole K1 penetrates through the first electrode insulating sub-layer 321, the second electrode insulating sub-layer 322, the first interlayer dielectric layer 231 and the first gate insulating layer 221.

Figure 3:
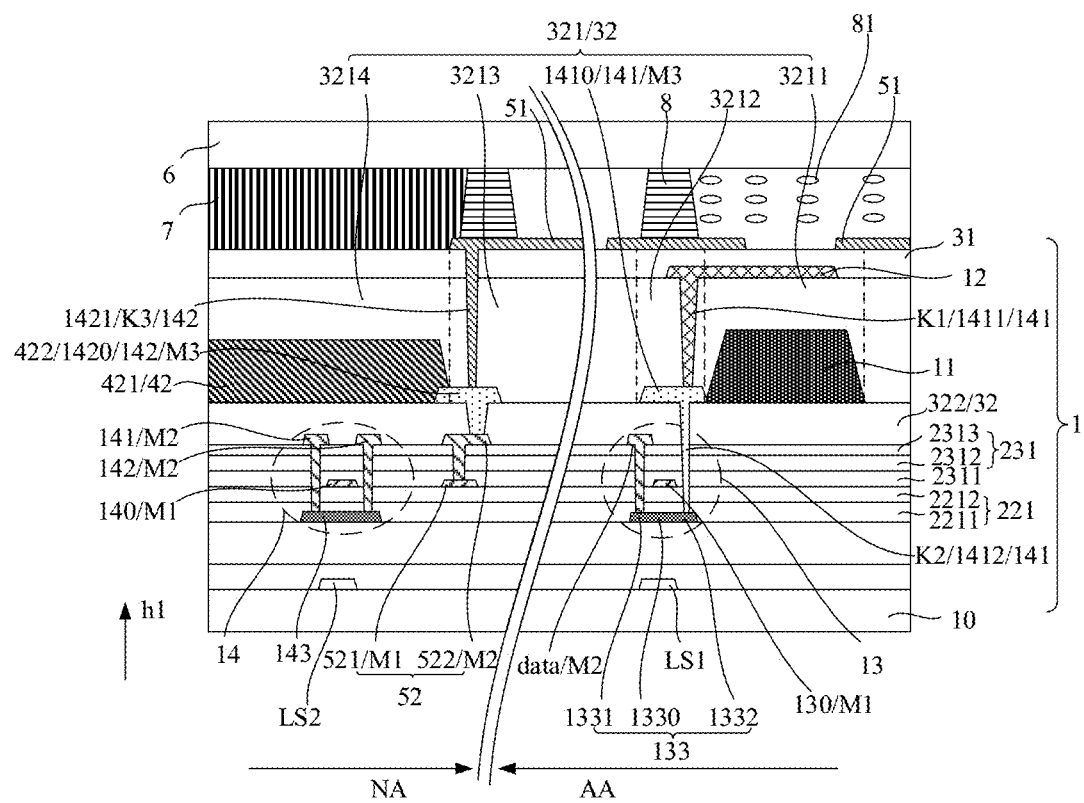
FIG. 3 is a schematic cross-sectional view of still another display panel according to an embodiment of the present disclosure.

In an embodiment, the first connecting hole K1 may be relatively shallow In an embodiment of the present disclosure. The first connecting hole K1 only penetrates through at least one of the insulating layers between the first semiconductor layer 133 and the pixel electrode 12. FIG. 3 is a schematic cross-sectional view of still another display panel according to an embodiment of the present disclosure. Exemplarily, as shown in FIG. 3, the first connecting portion 141 may further include a first connecting electrode 1410 between the pixel electrode 12 and the first semiconductor layer 133. Orthographic projection of the first connecting electrode 1410 on the plane of the substrate 10 at least partially overlaps with orthographic projection of the first semiconductor layer 133 on the plane of the substrate 10. The orthographic projection of the first connecting electrode 1410 on the plane of the substrate 10 at least partially overlaps with orthographic projection of the pixel electrode 12 on the plane of the substrate 10. In an embodiment of the present disclosure, the first connecting hole K1 may only penetrate through the insulating layer between the pixel electrode 12 and the first connecting electrode 1410. The first connecting sub-portion 1411 in the first connecting hole K1 is electrically connected to the first connecting electrode 1410 and the pixel electrode 12. In FIG. 3, the first connecting electrode 1410 is located between the first electrode insulating sub-layer 321 and the second electrode insulating sub-layer 322. The first electrode insulating sub-layer 321 is provided between the pixel electrode 12 and the first connecting electrode 1410. The first connecting hole K1 only penetrates through the first electrode insulating sub-layer 321.

Optionally, as shown in FIG. 3, the first connecting portion 141 further includes a second connecting sub-portion 1412 in a second connecting hole K2. Along the direction h1 perpendicular to the plane of the substrate 10, the second connecting hole K2 is located between the first connecting electrode 1410 and the first semiconductor layer 133. The second connecting sub-portion 1412 is electrically connected to the first connecting electrode 1410 and the first semiconductor layer 133. In an embodiment of the present disclosure, the second connecting hole K2 only penetrates through the insulating layer between the first connecting electrode 1410 and the first semiconductor layer 133. As shown in FIG. 3, the second connecting hole K2 penetrates through the second electrode insulating sub-layer 322, the first interlayer dielectric layer 231 and the first gate insulating layer 221.

In an embodiment of the present disclosure, the first connecting sub-portion 1411, the first connecting electrode 1410 and the second connecting sub-portion 1412 are collectively connected to the pixel electrode 12 and the first semiconductor layer 133. There is no need to provide a deep via hole between the first semiconductor layer 133 and the pixel electrode 12. This can lower a connection difficulty between the pixel electrode 12 and the first semiconductor layer 133, and reduce an area of the first connecting hole K1. As such, while orthographic projection of the first connecting hole K1 on the plane of the substrate 10 does not overlap with the color filter 11, the area of the color filter 11 can be made as large as possible improve an aperture ratio of the sub-pixel.

Exemplarily, as shown in FIG. 3, the array substrate 1 further includes a third conductive layer M3. Both the third conductive layer M3 and the color filter 11 are located between the second electrode insulating sub-layer 322 and the first electrode insulating sub-layer 321. The third conductive layer M3 includes the first connecting electrode 1410. Exemplarily, the third conductive layer M3 includes metal.

Exemplarily, as shown in FIG. 1 and FIG. 3, the first electrode insulating sub-layer 321 includes a first sub-portion 3211 and a second sub-portion 3212 that are located in the display region AA. Orthographic projection of the first sub-portion 3211 on the plane of the substrate 10 overlaps with the orthographic projection of the color filter 11 on the plane of the substrate 10. Orthographic projection of the second sub-portion 3212 on the plane of the substrate 10 does not overlap with the orthographic projection of the color filter 11 on the plane of the substrate 10. As shown in FIG. 3, the orthographic projection of the second sub-portion 3212 on the plane of the substrate 10 partially overlaps with the orthographic projection of the first connecting electrode 1410 on the plane of the substrate 10.

Optionally, as shown in FIG. 1 and FIG. 3, the first connecting hole K1 may penetrate through the second sub-portion 3212 In an embodiment of the present disclosure, such that the orthographic projection of the first connecting hole K1 on the plane of the substrate 10 does not overlap with the orthographic projection of the color filter 11 on the plane of the substrate 10.

In an embodiment of the present disclosure, it is to be noted that the first buffer layer 211, the first gate insulating layer 221, the first interlayer dielectric layer 231, the second electrode insulating sub-layer 322 and the first electrode insulating sub-layer 321 each may include one or more insulating layers. Different insulating layers may be made of a same material or different materials. For example, in case of a plurality of insulating layers, at least one of the insulating layers may be made of silicon oxide, and a remaining insulating layer may be made of silicon nitride. In FIG. 1 and FIG. 3, the first gate insulating layer 221 includes a first gate insulating sub-layer 2211 and a second gate insulating sub-layer 2212, and the first interlayer dielectric layer 231 includes a first interlayer dielectric sub-layer 2311, a second interlayer dielectric sub-layer 2312, and a third interlayer dielectric sub-layer 2313. In FIG. 2, the first gate insulating layer 221, the first interlayer dielectric layer 231 and the second electrode insulating layer 32 are a single-layer structure.

Figure 4:
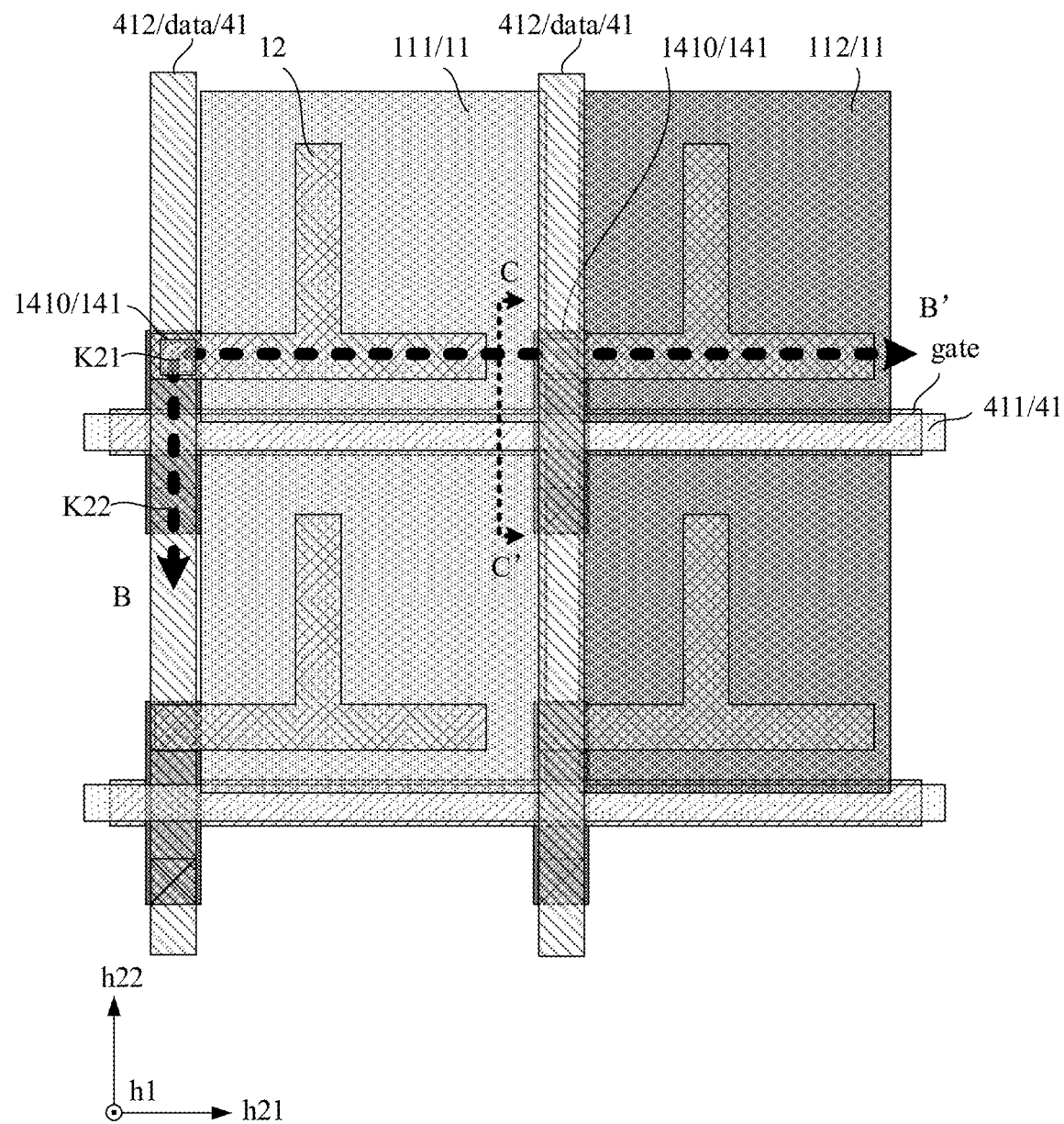
FIG. 4 is a schematic top view of a display region of a display panel according to an embodiment of the present disclosure.

In some embodiments of the present disclosure, the array substrate 1 includes a plurality of color filters 11 with different colors. FIG. 4 is a schematic top view of a display region of a display panel according to an embodiment of the present disclosure. As shown in FIG. 4, the plurality of color filters 11 are arranged in an array in a first direction h21 and a second direction h22. The first direction h21 intersects with the second direction h22. Both the first direction and the second direction are parallel to the plane of the substrate 10. In FIG. 4, the color filter 11 includes a color filter 111 of a first color and a color filter 112 of a second color. Exemplarily, the first color includes any one of a red, a green and a blue, and the second color includes another one of the red, the green and the blue except the first color.

Figure 5:
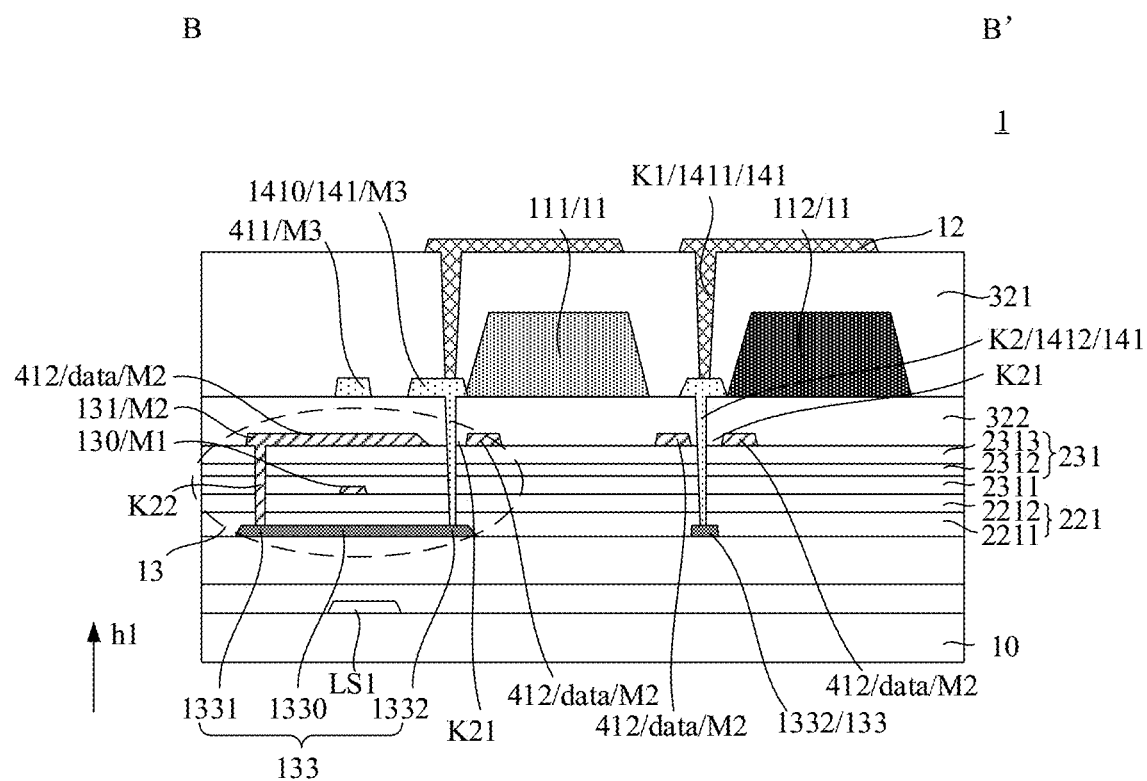
FIG. 5 is a schematic cross-sectional view along line BB' shown in FIG. 4 according to an embodiment of the present disclosure.

FIG. 5 is a schematic cross-sectional view along line BB' shown in FIG. 4. Referring to FIG. 4 and FIG. 5, the array substrate 1 further includes a first light-blocking portion 41 in the display region AA. In an embodiment of the present disclosure, the first light-blocking portion 41 may include a first light-blocking sub-portion 411 extending along the first direction h21 and a second light-blocking sub-portion 412 extending along the second direction h22. The first light-blocking sub-portion 411 is at least partially located between two adjacent color filters 11 in the second direction h22. The second light-blocking sub-portion 412 is at least partially located between two adjacent color filters 11 in the first direction h21. The first light-blocking sub-portion 411 and the second light-blocking sub-portion 412 can shield an opaque structure in the display region AA, so as to prevent light leakage due to a disordered electric field near the opaque structure. Exemplarily, the opaque structure includes the first transistor 13 and an opaque wiring portion such as the gate line and the data line. On the other hand, the first light-blocking sub-portion 411 and the second light-blocking sub-portion 412 can further prevent color mixing between different sub-pixels, thereby improving a display contrast and a display effect.

In an embodiment of the present disclosure, the first light-blocking portion 41 is provided in the array substrate 1. Compared with a solution in which the first light-blocking portion 41 is provided in a base opposite to the array substrate 1, this prevents the light leakage, can make a width of the first light-blocking portion 41 as small as possible, improves the aperture ratio of the sub-pixel, and can also improve the light transmittance of the display panel.

Optionally, In an embodiment of the present disclosure, at least one of the first light-blocking sub-portion 411 and the second light-blocking sub-portion 412 includes metal. The metal has a better light resistance than a resin material. In an embodiment of the present disclosure, at least one of the first light-blocking sub-portion 411 and the second light-blocking sub-portion 412 includes the metal. While ensuring the light resistance of the first light-blocking sub-portion 411 and/or the second light-blocking sub-portion 412, this can reduce a thickness of the first light-blocking sub-portion 411 or the second light-blocking sub-portion 412, and a width of the first light-blocking sub-portion 411 or the second light-blocking sub-portion 412, thereby further improving the aperture ratio of the sub-pixel. Exemplarily, the metal includes a metal material with a relatively low reflectivity, to reduce a reflected visibility. Optionally, the metal includes at least one of molybdenum, chromium, aluminum, titanium and copper or at least one of corresponding metal oxide and metal nitride of molybdenum, chromium, aluminum, titanium and copper.

Figure 6:
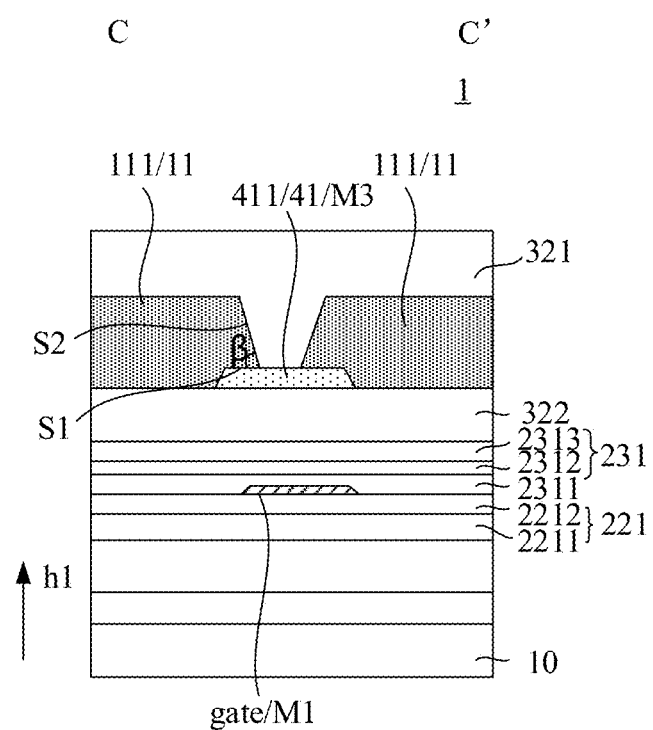
FIG. 6 is a schematic cross-sectional view along line CC' shown in FIG. 4 according to an embodiment of the present disclosure.

In addition, the metal is used to manufacture the first light-blocking portion 41 and/or the second light-blocking portion 42 In an embodiment of the present disclosure. While ensuring the light resistance, this can reduce the thickness of the first light-blocking portion 41 and/or the second light-blocking portion 42 as much as possible. FIG. 6 is a schematic cross-sectional view along line CC' shown in FIG. 4. As shown in FIG. 6, the color filter 11 is located at a side of the first light-blocking portion 41 away from the substrate 10, and the orthographic projection of the color filter 11 on the plane of the substrate 10 at least partially overlaps with orthographic projection of the first light-blocking portion 41 on the plane of the substrate 10. This can prevent an overlarge included angle β between a bottom S1 and a side S2 of the color filter 11, can make the first electrode insulating sub-layer 321 behind the color filter 11 better form a film and cover the color filter 11, and improves the yield of the display panel.

Optionally, the array substrate 1 may include a first film layer In an embodiment of the present disclosure. The first film layer includes a first portion and a second portion that are insulated from each other. The first portion includes the first light-blocking sub-portion 411. The second portion includes the first connecting electrode 1410. That is, the first light-blocking sub-portion 411 and the first connecting electrode 1410 may be provided in the same first film layer. The first light-blocking sub-portion and the first connecting electrode are provided in the same layer, which refers to that both the first light-blocking sub-portion and the first connecting electrode are made of a same material, and formed in a same patterning process.

Exemplarily, the first film layer may be a metal film layer nearest to the color filter 11 in the array substrate 1, to reduce a distance between the first light-blocking sub-portion 411 and the color filter 11, and not to project wide-angle light rays of one sub-pixel to another sub-pixel through a region between the first light-blocking sub-portion 411 and the color filter 11, thereby preventing the color mixing between different sub-pixels. In FIG. 5, the array substrate 1 includes the first conductive layer M1, the second conductive layer M2, and the third conductive layer M3. The first film layer includes the third conductive layer M3.

Optionally, as shown in FIG. 4, along the direction h1 perpendicular to the plane of the substrate 10, the first connecting electrode 1410 may not be overlap with the first light-blocking sub-portion 411. This ensures that the first connecting electrode 1410 and the first light-blocking sub-portion 411 are insulated from each other when provided in the same first film layer.

Optionally, as shown in FIG. 4, the first connecting electrode 1410 may at least partially overlap with the second light-blocking sub-portion 412. When the first connecting electrode 1410 and the first light-blocking sub-portion 411 are provided in the same first film layer, this prevents the first connecting electrode 1410 from additionally occupying a space of an aperture region for transmitting the light rays in the sub-pixel, and ensures the aperture ratio of the sub-pixel.

Exemplarily, as shown in FIG. 4, the second light-blocking sub-portion 412 may be electrically connected to the first transistor 13. Referring to FIG. 5, the second light-blocking sub-portion 412 may be electrically connected to the first terminal 131 of the first transistor 13. The first terminal 131 includes the source or the drain. The first terminal 131 is electrically connected to the first doped region 1331 of the first semiconductor layer 133. In response to display of the display panel, the second light-blocking sub-portion 412 provides a data signal for the first transistor 13. As such, the data line is reused as the second light-blocking sub-portion 412. This can further improve the aperture ratio of the sub-pixel, and can further simplify manufacture of the display panel.

Figure 7:
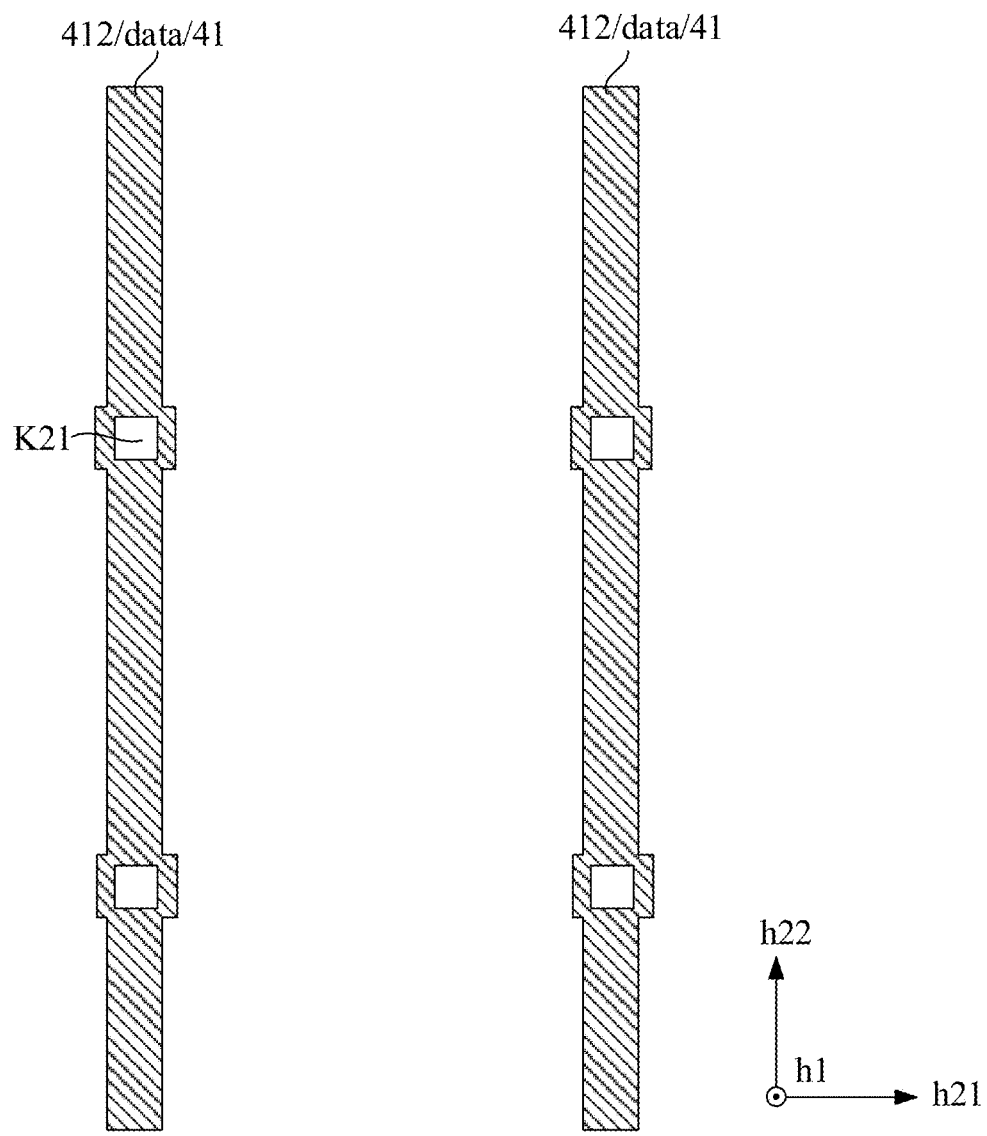
FIG. 7 is a schematic top view of a second conductive layer shown in FIG. 4 according to an embodiment of the present disclosure.

Optionally, as shown in FIG. 5, along the direction perpendicular to the plane of the substrate 10, the second light-blocking sub-portion 412 may be located between the first connecting electrode 1410 and the first semiconductor layer 133. FIG. 7 is a schematic top view of a second conductive layer shown in FIG. 4. Referring to FIG. 4, FIG. 5, and FIG. 7, the second light-blocking sub-portion 412 includes a first sub-hole K21. The orthographic projection of the first connecting electrode 1410 on the plane of the substrate 10 at least partially overlaps with the first sub-hole K21. With the first sub-hole K21, the first connecting electrode 1410 is electrically connected to the first semiconductor layer 133 through a connecting portion in the first sub-hole K21. This ensures the aperture ratio of the sub-pixel, without affecting electrical connection between the first connecting electrode 1410 and the first semiconductor layer 133.

Exemplarily, as shown in FIG. 4 and FIG. 5, the array substrate 1 further includes a second sub-hole K22. The first terminal 131 of the first transistor 13 is electrically connected to the first doped region 1331 of the first semiconductor layer 133 through a connecting portion in the second sub-hole K22. As shown in FIG. 5, the second sub-hole K22 penetrates through the first gate insulating layer 221 and the first interlayer dielectric layer 231.

Figure 8:
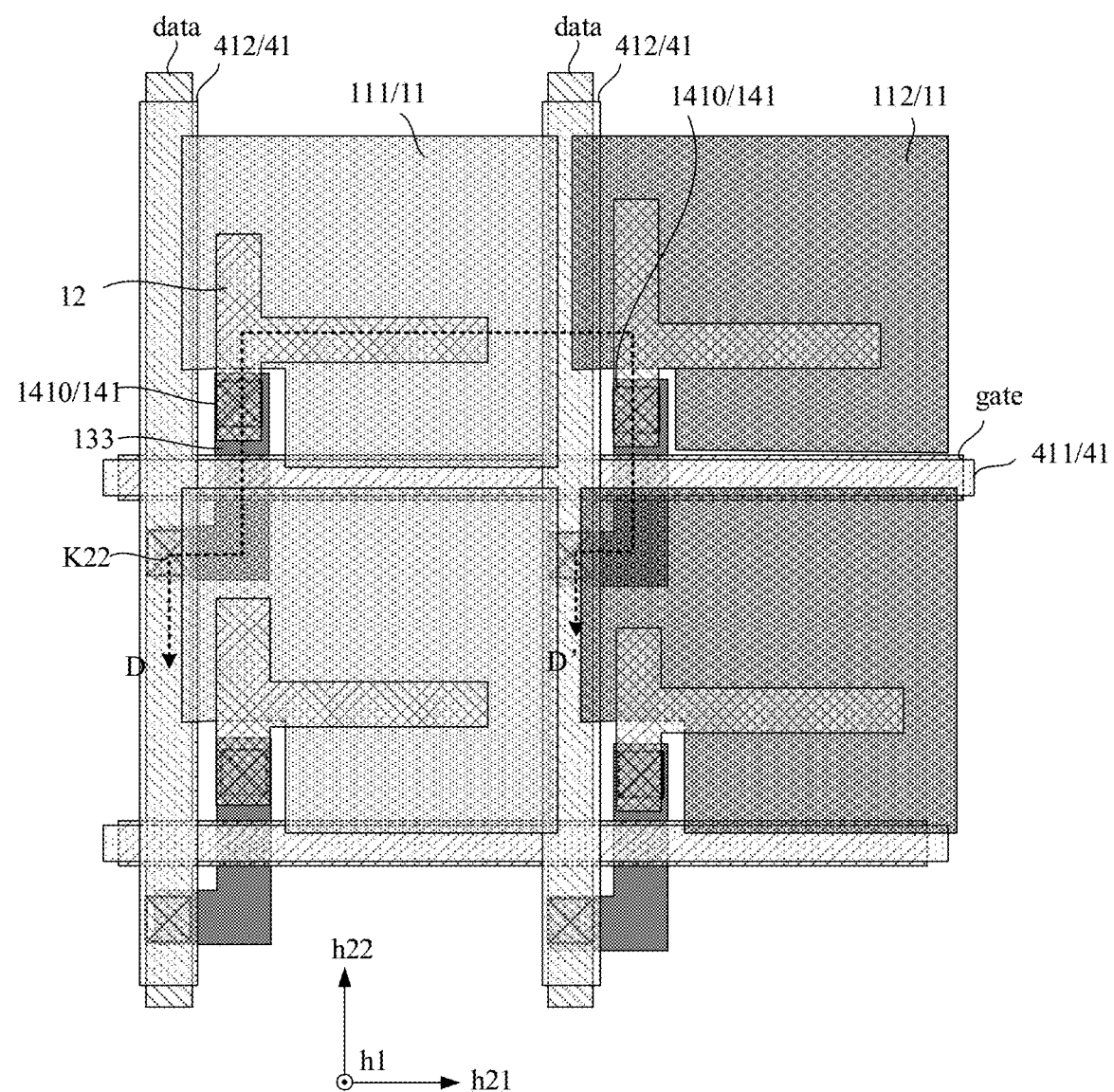
FIG. 8 is a schematic top view of a display region of another display panel according to an embodiment of the present disclosure.
Figure 9:
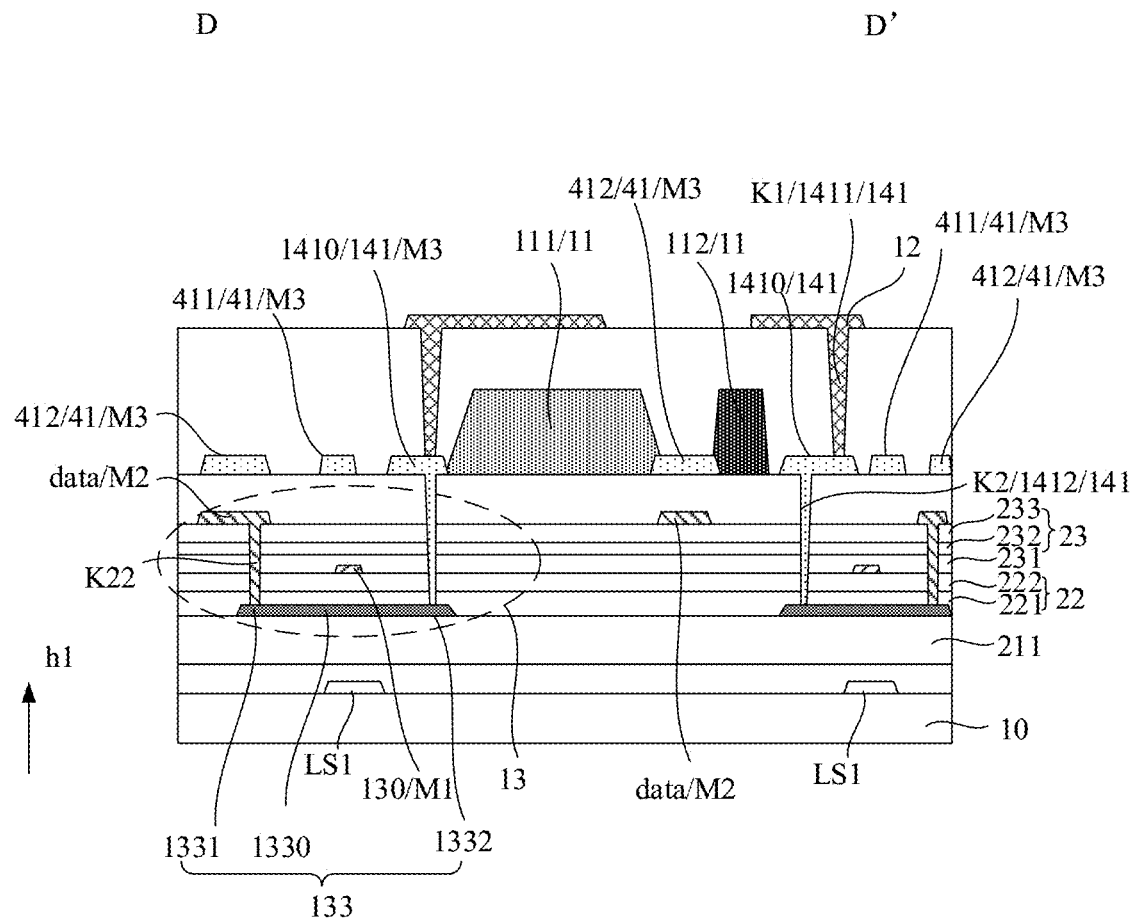
FIG. 9 is a schematic cross-sectional view along line DD' shown in FIG. 8 according to an embodiment of the present disclosure.

Optionally, beside the first portion and the second portion, a third portion may further be provided in the first film layer In an embodiment of the present disclosure. The third portion is insulated from the first portion and the second portion. The third portion includes the second light-blocking sub-portion 412. FIG. 8 is a schematic top view of a display region of another display panel according to an embodiment of the present disclosure. FIG. 9 is a schematic cross-sectional view along line DD' shown in FIG. 8. Referring to FIG. 8 and FIG. 9, the array substrate 1 includes the first conductive layer M1, the second conductive layer M2, and the third conductive layer M3. The first film layer includes the third conductive layer M3. The first light-blocking sub-portion 411, the second light-blocking sub-portion 412 and the first connecting electrode 1410 may be provided in the same first film layer. This can simplify a manufacturing process of the display panel and reduce a thickness of the display panel. On the other hand, a distance between the second light-blocking sub-portion 412 and the color filter 11 can also be reduced, so as to prevent color mixing between two adjacent sub-pixels, and ensure a display effect. Exemplarily, the first light-blocking sub-portion 411 and the second light-blocking sub-portion 412 come in contact with the color filter 11 In an embodiment of the present disclosure.

Exemplarily, as shown in FIG. 8, along the direction h1 perpendicular to the plane of the substrate 10, the orthographic projection of the first connecting electrode 1410 on the plane of the substrate 10 does not overlap with orthographic projection of the first light-blocking sub-portion 411 on the plane of the substrate 10, and the orthographic projection of the first connecting electrode 1410 on the plane of the substrate 10 does not overlap with orthographic projection of the second light-blocking sub-portion 412 on the plane of the substrate 10. While reducing the thickness of the display panel, and simplifying the manufacture of the display panel, this ensures that the first connecting electrode 1410 is insulated from the first light-blocking sub-portion 411 and the second light-blocking sub-portion 412.

It is to be noted that the shape of the orthographic projection of the pixel electrode 12 on the plane of the substrate 10 is only schematic in FIG. 4 and FIG. 8. In an embodiment of the present disclosure, the shape of the orthographic projection of the pixel electrode 12 on the plane of the substrate 10 can be adjusted according to different design requirements.

Referring also to FIG. 1 and FIG. 3, the array substrate 1 further includes a non-display region NA. The non-display region NA includes a second light-blocking portion 42. In response to display of the display panel, the second light-blocking portion 42 can prevent leakage of the light rays of the backlight module from the non-display region NA.

Optionally, as shown in FIG. 1 and FIG. 3, the second light-blocking portion 42 may be provided between the second electrode insulating sub-layer 322 and the first electrode insulating sub-layer 321. Exemplarily, the second light-blocking portion 42 may include a third light-blocking sub-portion 421 In an embodiment of the present disclosure. The third light-blocking sub-portion 421 includes a light-absorbing material. With the light-absorbing material, the third light-blocking sub-portion 421 cannot be coupled to a conductive structure in the non-display region NA. Exemplarily, the light-absorbing material includes resin.

Exemplarily, as shown in FIG. 1 and FIG. 3, the array substrate 1 further includes a common connecting line 52 in the non-display region NA. The common electrode 51 is electrically connected to the common connecting line 52 through a second connecting portion 142. Exemplarily, the common connecting line 52 receives a common voltage signal from a driver chip (not shown), and transmits the common voltage signal to the common electrode 51 through the second connecting portion 142. As shown in FIG. 1 and FIG. 3, the second connecting portion 142 includes a third connecting sub-portion 1421 in a third connecting hole K3. The third connecting hole K3 penetrates through at least one of film layers between the common electrode 51 and the common connecting line 52. Along the direction parallel to the substrate 10, the third connecting sub-portion 1421 at least partially overlaps with the third light-blocking sub-portion 421.

Exemplarily, as shown in FIG. 1 and FIG. 3, orthographic projection of the third connecting sub-portion 1421 on the plane of the substrate 10 does not overlap with orthographic projection of the third light-blocking sub-portion 421 on the plane of the substrate 10. While preventing the third connecting hole K3 in the third light-blocking sub-portion 421, ensuring that the common electrode 51 and the common connecting line 52 are connected smoothly, and lowering a manufacturing difficulty of the third connecting hole K3, this can increase a thickness of the third light-blocking sub-portion 421 to ensure a light absorption property of the third light-blocking sub-portion 421.

Referring also to FIG. 1 and FIG. 3, the first electrode insulating sub-layer 321 further includes a third sub-portion 3213 and a fourth sub-portion 3214 that are located in the non-display region NA. Orthographic projection of the third sub-portion 3213 on the plane of the substrate 10 does not overlap with the orthographic projection of the third light-blocking sub-portion 421 on the plane of the substrate 10, and orthographic projection of the fourth sub-portion 3214 on the plane of the substrate 10 overlaps with the orthographic projection of the third light-blocking sub-portion 421 on the plane of the substrate 10. In an embodiment of the present disclosure, the third connecting hole K3 may penetrate through the third sub-portion 3213. This prevents the third connecting hole K3 from passing through the third light-blocking sub-portion 421, and lowers the process difficulty of the third connecting hole K3.

Exemplarily, as shown in FIG. 1 and FIG. 3, the common connecting line 52 may include a first common connecting sub-line 521 in the first conductive layer M1 and a second common connecting sub-line 522 in the second conductive layer M2. The first common connecting sub-line 521 is electrically connected to the second common connecting sub-line 522, to reduce a resistance of the common connecting line 52.

Exemplarily, when the third connecting hole K3 is formed, the third connecting hole K3 may penetrate through all of the insulating layers between the common electrode 51 and the common connecting line 52. In FIG. 1, the first electrode insulating layer 31, the first electrode insulating sub-layer 321 and the second electrode insulating sub-layer 322 are provided between the common electrode 51 and the common connecting line 52. The third connecting hole K3 penetrates through the first electrode insulating layer 31, the first electrode insulating sub-layer 321 and the second electrode insulating sub-layer 322.

Or, as shown in FIG. 3, the third connecting hole K3 may be relatively shallow In an embodiment of the present disclosure. A second connecting electrode 1420 is provided between the third connecting hole K3 and the common connecting line 52. The third connecting hole K3 penetrates through the first electrode insulating layer 31 and the first electrode insulating sub-layer 321. As shown in FIG. 3, the second connecting electrode 1420 is electrically connected to the common connecting line 52 and the third connecting sub-portion 1421. This can reduce a depth of the third connecting hole K3, and lower the manufacturing difficulty of the third connecting hole K3.

Exemplarily, beside the first portion and the second portion, the first film layer may further include a fourth portion In an embodiment of the present disclosure. The fourth portion includes the second connecting electrode 1420. That is, as shown in FIG. 3, the second connecting electrode 1420 and the first connecting electrode 1410 may be provided in the same first film layer, to simplify the manufacturing process of the display panel. In FIG. 3, the first film layer includes the third conductive layer M3.

Optionally, as shown in FIG. 3, the second light-blocking portion 42 further includes a fourth light-blocking sub-portion 422. The fourth light-blocking sub-portion 422 includes the second connecting electrode 1420. As such, the second connecting electrode 1420 is reused as the fourth light-blocking sub-portion 422. While making the third connecting hole K3 keep away from the third light-blocking sub-portion 421 to reduce the manufacturing difficulty of the third connecting hole K3, this can prevent light leakage of the display panel at a position without the third light-blocking sub-portion 421.

Exemplarily, as shown in FIG. 3, the orthographic projection of the second connecting electrode 1420 on the plane of the substrate 10 at least partially overlaps with the orthographic projection of the third light-blocking sub-portion 421 on the plane of the substrate 10, so as to prevent a gap between the second connecting electrode and the third light-blocking sub-portion, and prevent light leakage at the gap.

Optionally, as shown in FIG. 2, along the direction h1 perpendicular to the plane of the substrate 10, the first semiconductor layer 133 and the pixel electrode 12 may be located on a same side of the color filter 11. In FIG. 2, both the first semiconductor layer 133 and the pixel electrode 12 are located at a side of the color filter 11 away from the substrate 10. In an embodiment of the present disclosure, the first semiconductor layer 133 may be electrically connected to the pixel electrode 12 through a third connecting portion 143 in a fourth connecting hole K4. The fourth connecting hole K4 is located at a side of the color filter 11 adjacent to the pixel electrode 12. Along the direction parallel to the plane of the substrate 10, the fourth connecting hole K4 does not overlap with the color filter 11. When the third connecting portion 143 in the fourth connecting hole K4 is provided to electrically connect the first semiconductor layer 133 and the pixel electrode 12, this can prevent the fourth connecting hole K4 from passing through the color filter 11, and can lower a manufacturing difficulty of the fourth connecting hole K4.

Optionally, as shown in FIG. 2, the fourth connecting hole K4 penetrates through the first gate insulating layer 221, the first interlayer dielectric layer 231 and the second electrode insulating layer 32. Different from FIG. 1 and FIG. 3, the first gate insulating layer 221, the first interlayer dielectric layer 231 and the second electrode insulating layer 32 are located on a same side of the color filter 11 in FIG. 2.

Exemplarily, the first semiconductor layer 133 may include metal oxide In an embodiment of the present disclosure. This can improve a carrier mobility of the first semiconductor layer 133. When the display panel is designed according to the film layer structure in FIG. 2, this can improve a light transmittance of the first semiconductor layer 133, thereby reducing the visibility of the first semiconductor layer 133 and improving the display effect. Optionally, the first semiconductor layer 133 includes indium gallium zinc oxide (IGZO).

Figure 10:
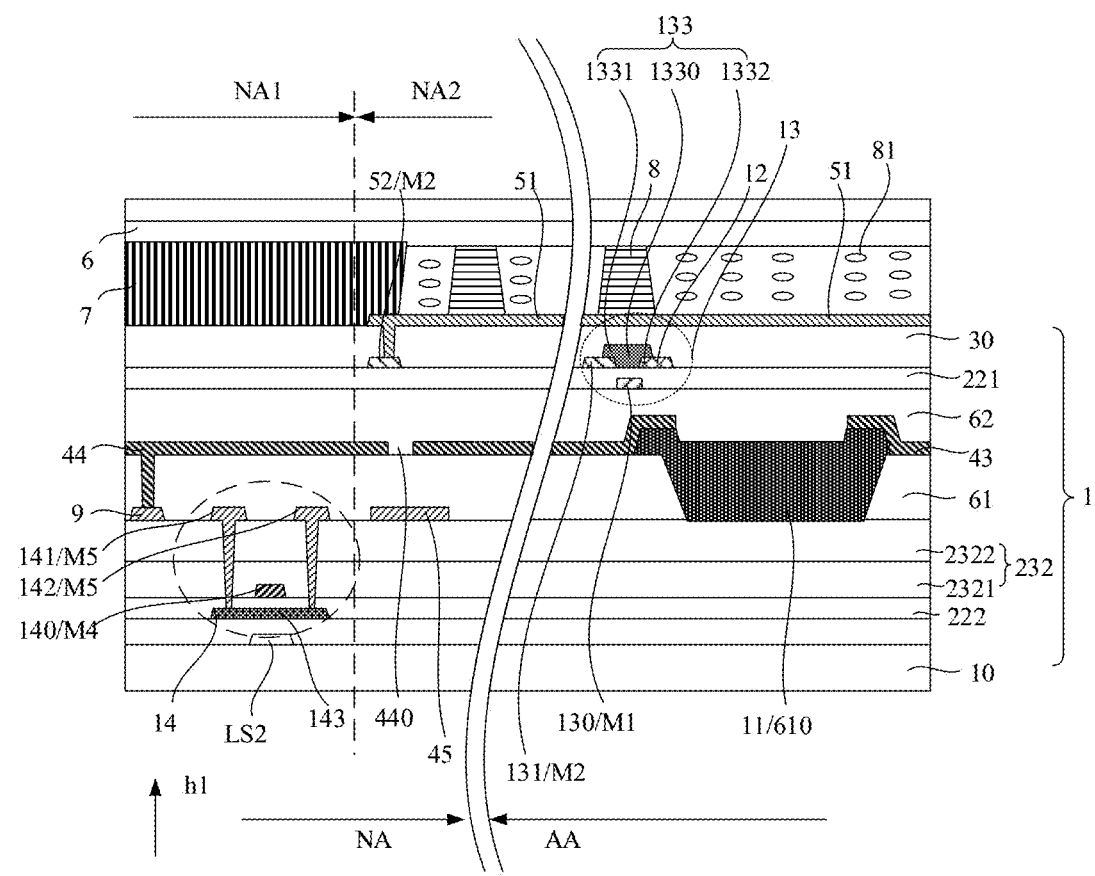
FIG. 10 is a schematic cross-sectional view of still another display panel according to an embodiment of the present disclosure.

FIG. 10 is a schematic cross-sectional view of still another display panel according to an embodiment of the present disclosure. Optionally, as shown in FIG. 10, along the direction h1 perpendicular to the plane of the substrate 10, the first semiconductor layer 133 and the pixel electrode 12 are located on a same side of the color filter 11. In an embodiment of the present disclosure, no insulating layer is provided between the first semiconductor layer 133 and the pixel electrode 12. The first semiconductor layer 133 comes in contact with and is electrically connected to the pixel electrode 12. There is no need to form a hole for electrically connecting the pixel electrode 12 and the first semiconductor layer 133. This can simplify the manufacture of the display panel.

Exemplarily, as shown in FIG. 10, the pixel electrode 12 may be located at a side of the first semiconductor layer 133 adjacent to the substrate 10. That is, the first transistor 13 forms a bottom gate-bottom contact (BGBC) structure. The bottom contact refers to that a surface of the first semiconductor layer 133 adjacent to the substrate 10 comes in contact with the pixel electrode 12 and the first terminal 131. Based on the structure, in response to display of the display panel, carriers can be directly injected into the channel region 1330 of the first transistor 13 from an edge of the pixel electrode 12 or the first terminal 131, thereby improving an injection efficiency of the carriers. Certainly, the first terminal 131 and the pixel electrode 12 may also be provided at a side of the first semiconductor layer 133 away from the substrate 10 In an embodiment of the present disclosure. The first terminal 131 and the pixel electrode 12 come in contact with a surface of the first semiconductor layer 133 away from the substrate 10. That is, the first transistor 13 forms a bottom gate-top contact (BGTC) structure.

Optionally, as shown in FIG. 10, the first gate insulating layer 221 is located between the first conductive layer M1 and the first semiconductor layer 133. The first terminal 131 of the first transistor 13 and the pixel electrode 12 are located between the first gate insulating layer 221 and the first semiconductor layer 133. The first doped region 1331 of the first semiconductor layer 133 is located at a side of the first terminal 131 away from the substrate 10. The first doped region 1331 comes in contact with and is electrically connected to the first terminal 131. The second doped region 1332 of the first semiconductor layer 133 is located at a side of the pixel electrode 12 away from the substrate 10. The second doped region 1332 comes in contact with and is electrically connected to the pixel electrode 12. Exemplarily, as shown in FIG. 10, the array substrate 1 further includes an electrode insulating layer 30 between the common electrode 51 and the pixel electrode 12.

Exemplarily, the pixel electrode 12 and the first terminal 131 of the first transistor 13 may be made of a same material and formed in a same patterning process In an embodiment of the present disclosure. For example, the pixel electrode 12 and the first terminal 131 include transparent metal oxide, so as not to affect normal light emission of the sub-pixel. Or, the pixel electrode 12 and the first terminal 131 of the first transistor 13 may be made of different materials in different patterning processes In an embodiment of the present disclosure. For example, the pixel electrode 12 may include transparent conductive oxide such as indium tin oxide (ITO) and indium zinc oxide (IZO), and the first terminal 131 may include metal In an embodiment of the present disclosure.

Exemplarily, In an embodiment of the present disclosure, the non-display region NA includes a gate driving circuit. The gate driving circuit includes a cascaded shift register unit. The shift register unit is electrically connected to a gate line. As shown in FIG. 1, FIG. 2, FIG. 3 and FIG. 10, the cascaded shift register unit includes a second transistor 14. The second transistor 14 includes a second gate 140, a first terminal 141, a second terminal 142, and a second semiconductor layer 143. One of the first terminal 141 and the second terminal 142 serves as a source, while the other servers as a drain.

In an implementation, as shown in FIG. 1 and FIG. 3, the first semiconductor layer 133 and the second semiconductor layer 143 may be made of a same material and formed in a same patterning process, and the first gate 130 and the second gate 140 may be made of a same material and formed in a same patterning process. Optionally, the first semiconductor layer 133 and the second semiconductor layer 143 include low-temperature polysilicon or metal oxide.

Or, at least one of structures in the first transistor 13 and the second transistor 14 may also be provided on a different layer. In an embodiment of the present disclosure. As shown in FIG. 2 and FIG. 10, the first transistor 13 and the second transistor 14 may be respectively located at two sides of the color filter 11. In an embodiment of the present disclosure, along the direction h1 perpendicular to the plane of the substrate 10, the first semiconductor layer 133 and the second semiconductor layer 143 may be respectively located at the two sides of the color filter 11, and the first gate 130 and the second gate 140 may be respectively located at the two sides of the color filter 11. Optionally, the first semiconductor layer 133 and the second semiconductor layer 143 may be made of a same material, and may also be made of different materials. The first gate 130 and the second gate 140 may be made of a same material, and may also be made of different materials. The first transistor 13 and the second transistor 14 are provided independently. In response to manufacturing of the display panel, the first transistor 13 and the second transistor 14 can be adjusted according to different requirements, thereby improving the process flexibility of the first transistor and the second transistor.

Optionally, as shown in FIG. 2 and FIG. 10, the array substrate 1 further includes a fourth conductive layer M4 and a fifth conductive layer M5. The fourth conductive layer M4 includes the second gate 140 of the second transistor 14. The fifth conductive layer M5 includes the first terminal 141 and the second terminal 142 of the second transistor 14. Exemplarily, as shown in FIG. 2 and FIG. 10, the fourth conductive layer M4 and the fifth conductive layer M5 are located at a side of the color filter 11 adjacent to the substrate 10. Optionally, the fourth conductive layer M4 and the fifth conductive layer M5 include metal.

Exemplarily, as shown in FIG. 2 and FIG. 10, the array substrate 1 further includes a second gate insulating layer 222 and a second interlayer dielectric layer 232. The second gate insulating layer 222 is located between the second semiconductor layer 143 and the fourth conductive layer M4. The second interlayer dielectric layer 232 is located between the fifth conductive layer M5 and the fourth conductive layer M4. In FIG. 2 and FIG. 10, the second interlayer dielectric layer 232 includes a fourth interlayer dielectric sub-layer 2321 and a fifth interlayer dielectric sub-layer 2322 that are stacked.

Figure 11:
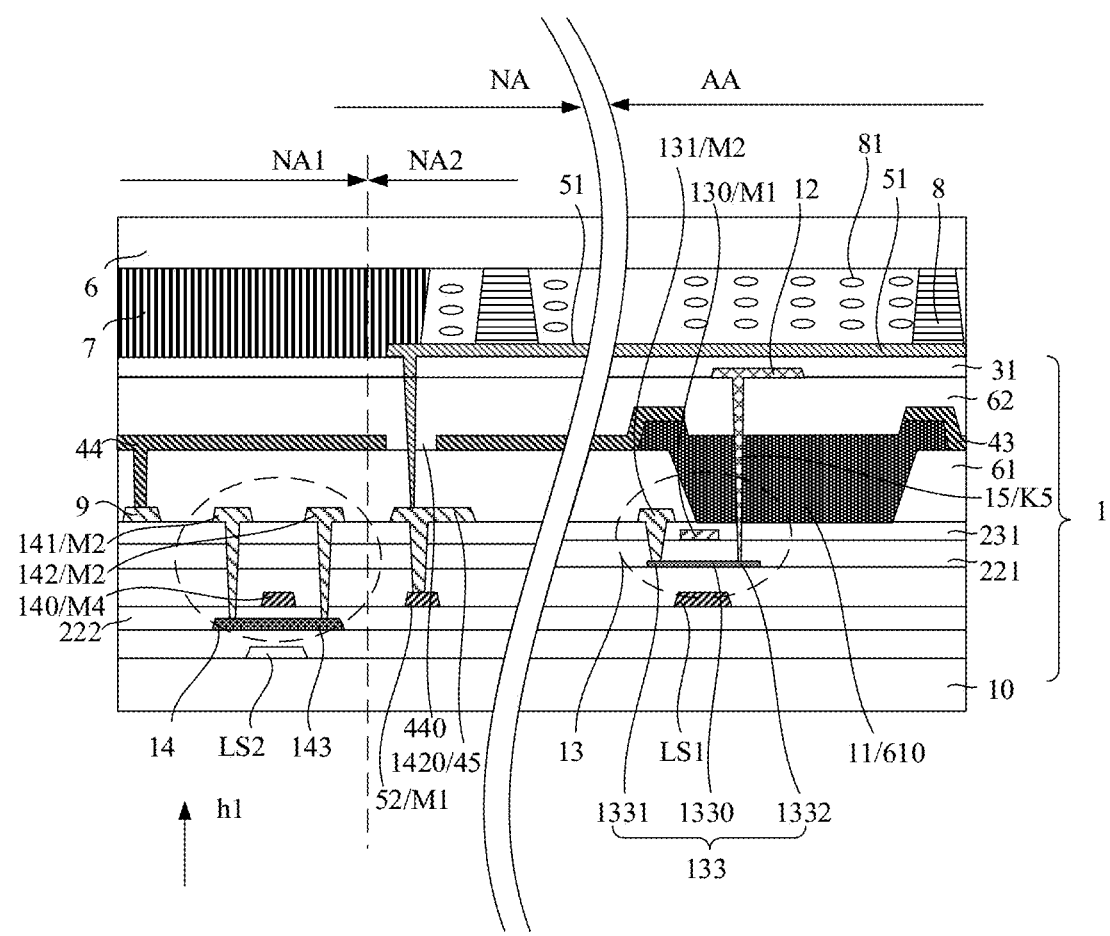
FIG. 11 is a schematic cross-sectional view of still another display panel according to an embodiment of the present disclosure.
Figure 12:
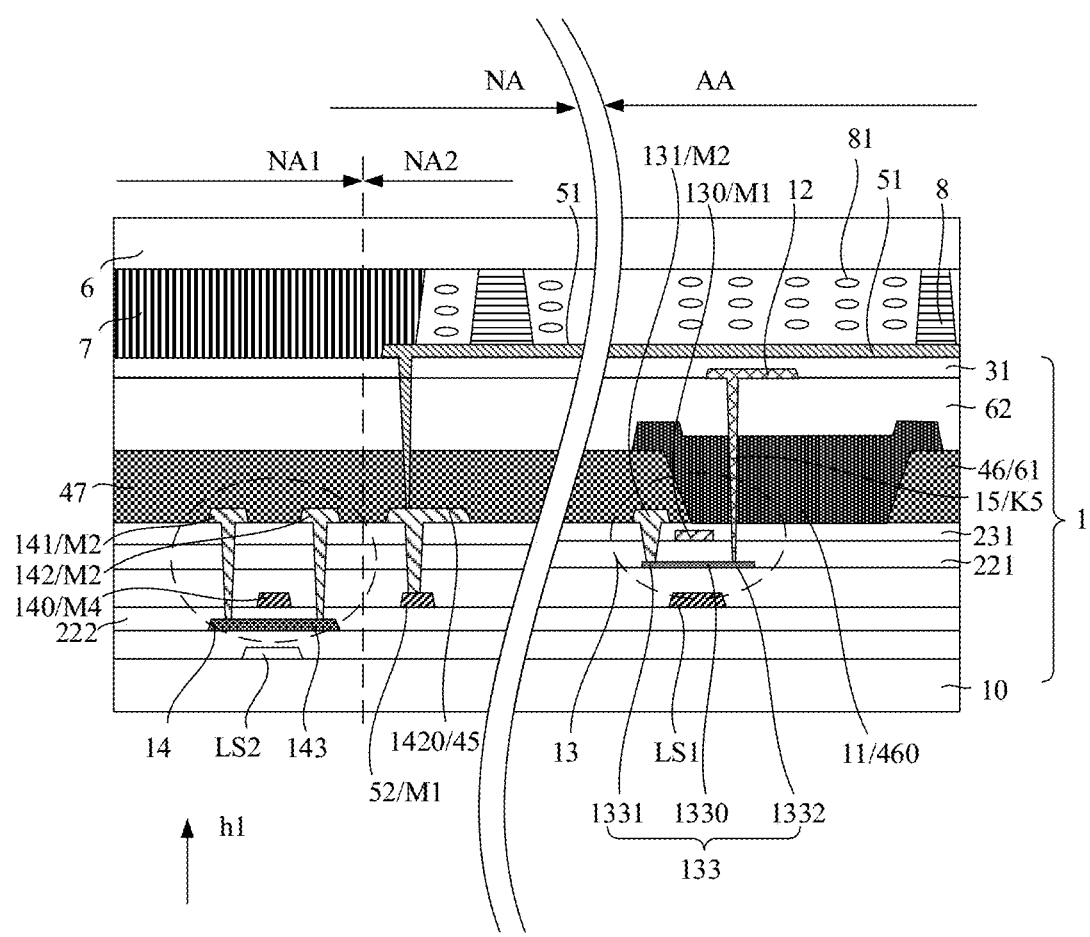
FIG. 12 is a schematic cross-sectional view of still another display panel according to an embodiment of the present disclosure.

Or, as shown in FIG. 11 and FIG. 12, the first transistor 13 and the second transistor 14 are located at a side of the color filter 11 adjacent to the substrate 10. The first semiconductor layer 133 and the second semiconductor layer 143 are provided on different layers. The first gate 130 and the second gate 140 are provided on different layers. FIG. 11 and FIG. 12 are respectively schematic cross-sectional views of still another two display panels according to an embodiment of the present disclosure.

Different from FIG. 2 and FIG. 10, beside the first terminal 131 of the first transistor 13, the second conductive layer M2 further includes the first terminal 141 and the second terminal 142 of the second transistor 14 in FIG. 11 and FIG. 12.

As shown in FIG. 11 and FIG. 12, the array substrate 1 further includes a fourth conductive layer M4. The fourth conductive layer M4 includes the second gate 140 of the second transistor 14. Along a direction away from the substrate 10, the second semiconductor layer 143, the fourth conductive layer M4, the first semiconductor layer 133, the first conductive layer M1 and the second conductive layer M2 are sequentially stacked.

Exemplarily, as shown in FIG. 2, FIG. 10 and FIG. 11, the display region AA further includes a first insulating layer 61, a third light-blocking portion 43 in the display region AA, and a fourth light-blocking portion 44 in the non-display region NA. The first insulating layer 61 includes a first aperture 610. The color filter 11 is at least partially located in the first aperture 610. Both the third light-blocking portion 43 and the fourth light-blocking portion 44 are located at a side of the first insulating layer 61 away from the substrate 10. Optionally, in response to manufacturing of the display panel having the structure shown in FIG. 2, FIG. 10 and FIG. 11, the first insulating layer 61 is first provided. The first aperture 610 is formed in the first insulating layer 61. The color filter 11 is provided in the first aperture 610. The third light-blocking portion 43 and the fourth light-blocking portion 44 are provided at a side of the color filter 11 away from the substrate 10. Exemplarily, the third light-blocking portion 43 and the fourth light-blocking portion 44 may be made of a same material, and formed in a same patterning process. The first aperture 610 may serve as an accommodating space of the color filter 11. This makes the position of the color filter 11 more accurate.

As shown in FIG. 2, FIG. 9 and FIG. 10, the array substrate 1 further includes a second insulating layer 62. The second insulating layer 62 is located at a side of each of the third light-blocking portion 43 and the fourth light-blocking portion 44 away from the substrate 10. The second insulating layer 62 covers the third light-blocking portion 43 and the fourth light-blocking portion 44. Exemplarily, both the first insulating layer 61 and the second insulating layer 62 include a transparent organic material. Optionally, both the first insulating layer 61 and the second insulating layer 62 include a planarization layer. In an embodiment of the present disclosure, the second insulating layer 62 includes the planarization layer. This can improve a flatness on a surface of the second insulating layer 62. As shown in FIG. 2, the first semiconductor layer 133 may be provided at a side of the second insulating layer 62 away from the substrate 10, so as to ensure a yield of the first semiconductor layer 133. Or, as shown in FIG. 10, the first gate 130 may be provided at the side of the second insulating layer 62 away from the substrate 10, so as to ensure a yield of the first gate 130 and a yield of the gate line in the same layer as the first gate 130. Or, as shown in FIG. 11, the pixel electrode 12 may be provided at the side of the second insulating layer 62 away from the substrate 10, so as to ensure a yield of the pixel electrode 12.

Moreover, while the flatness on the surface of the second insulating layer 62 is ensured, when the first insulating layer 61 and the second insulating layer 62 are provided with the planarization layer, a single planarization layer with a large thickness can be prevented, and the yield of the first insulating layer 61 and the second insulating layer 62 is improved.

In addition, the third light-blocking portion 43 and the fourth light-blocking portion 44 are located between the first insulating layer 61 and the second insulating layer 62 In an embodiment of the present disclosure. While preventing the light leakage, this can prevent the third light-blocking portion 43 and the fourth light-blocking portion 44 from affecting a flatness at corresponding positions.

Optionally, the third light-blocking portion 43 and/or the fourth light-blocking portion 44 may include metal In an embodiment of the present disclosure. The metal has a better light resistance than a resin material. In an embodiment of the present disclosure, at least one of the third light-blocking portion 43 and/or the fourth light-blocking portion 44 includes the metal. While ensuring the light resistance of the third light-blocking portion 43 and/or the fourth light-blocking portion 44, this can reduce the thickness of the third light-blocking portion 43 and/or the fourth light-blocking portion 44 and the width of the third light-blocking portion 43 and/or the fourth light-blocking portion 44. Exemplarily, the metal includes a metal material with a relatively low reflectivity, so as to reduce a reflected visibility. Optionally, the metal includes at least one of molybdenum, chromium, aluminum, titanium and copper or at least one of corresponding metal oxide and metal nitride of the molybdenum, the chromium, the aluminum, the titanium and the copper.

Exemplarily, as shown in FIG. 2 and FIG. 10, the orthographic projection of the channel region 1330 of the first semiconductor layer 133 on the plane of the substrate 10 may overlap with orthographic projection of the third light-blocking portion 43 on the plane of the substrate. The third light-blocking portion 43 can prevent the light rays of the backlight module from irradiating the channel region 1330. This can ensure that the first transistor 13 is turned on accurately.

Exemplarily, the fourth light-blocking portion 44 may include the metal, and the fourth light-blocking portion 44 may be grounded In an embodiment of the present disclosure. Exemplarily, as shown in FIG. 2, FIG. 10 and FIG. 11, the array substrate 1 includes a grounding portion 9. The fourth light-blocking portion 44 is electrically connected to the grounding portion 9. The fourth light-blocking portion 44 is grounded In an embodiment of the present disclosure. While reducing a thickness of the fourth light-blocking portion 44, this can weaken coupling interference between the fourth light-blocking portion 44 and other conductive structures in the non-display region NA.

Optionally, as shown in FIG. 2, FIG. 10 and FIG. 11, a second aperture 440 in the non-display region NA may further be formed in the fourth light-blocking portion 44 In an embodiment of the present disclosure. The second aperture 440 can reduce an overlapping area between the fourth light-blocking portion 44 and other conductive structures in the non-display region NA, thereby weakening the coupling interference between the fourth light-blocking portion 44 and the other conductive structures in the non-display region NA.

Exemplarily, as shown in FIG. 2, FIG. 10 and FIG. 11, the non-display region NA further includes a fifth light-blocking portion 45. Along the direction perpendicular to the plane of the substrate 10, the fifth light-blocking portion 45 at least partially overlaps with the second aperture 440. The fifth light-blocking portion 45 can prevent the light leakage of the non-display region NA at the second aperture 440.

Optionally, the fifth light-blocking portion 45 may be provided at a side of the second aperture 440 adjacent to the substrate 10 In an embodiment of the present disclosure. For example, as shown in FIG. 2 and FIG. 10, the fifth light-blocking portion 45 may be provided in the fifth conductive layer M5. Or, as shown in FIG. 11, the fifth light-blocking portion 45 may be provided in the second conductive layer M2.

Or, the fifth light-blocking portion 45 may also be provided at a side of the second aperture 440 away from the substrate 10 In an embodiment of the present disclosure.

Exemplarily, as shown in FIG. 2, FIG. 10 and FIG. 11, the non-display region NA includes a peripheral circuit region NA1 and a common wiring region NA2. The peripheral circuit region NA1 includes the shift register unit. The shift register unit includes the second transistor 14. The common wiring region NA2 includes the common connecting line 52. The second aperture 440 may be located in the common wiring region NA2 In an embodiment of the present disclosure. Compared with the peripheral circuit region NA1, there are less conductive structures in the common wiring region NA2. By forming the second aperture 440 in the common wiring region NA2 In an embodiment of the present disclosure, while weakening the coupling interference between the fourth light-blocking portion 44 and other conductive structures, this is more convenient to provide the fifth light-blocking portion 45 not interfering with the conductive structure in the common wiring region NA2.

Exemplarily, as shown in FIG. 2 and FIG. 10, the common connecting line 52 may be provided in the second conductive layer M2, and the fifth light-blocking portion 45 may be provided in the fifth conductive layer M5.

Or, as shown in FIG. 11, the common connecting line 52 may be provided in the fourth conductive layer M4, and the fifth light-blocking portion 45 may be provided in the second conductive layer M2.

Optionally, as shown in FIG. 11, the fifth light-blocking portion 45 may be located between the common electrode 51 and the common connecting line 52, and the fifth light-blocking portion 45 is electrically connected to the common electrode 51 and the common connecting line 52. The fifth light-blocking portion 45 not only can block emission of the light rays to prevent the light leakage in the non-display region NA, but also can be electrically connected to the common electrode 51 and the common connecting line 52. Neither a component for preventing the light leakage in the non-display region NA nor a component electrically connected to the common electrode 51 and the common connecting line 52 is provided. This simplifies the structure of the display panel and the manufacturing process of the display panel.

Exemplarily, as shown in FIG. 11 and FIG. 12, the color filter 11 may be located between the pixel electrode 12 and the first semiconductor layer 133, and the pixel electrode 12 may be electrically connected to the first semiconductor layer 133 through a fifth connecting portion 15. The fifth connecting portion 15 is at least partially located in a fifth connecting hole K5. The fifth connecting hole K5 penetrates through the color filter 11.

Exemplarily, as shown in FIG. 12, the array substrate 1 further includes a sixth light-blocking portion 46 and a seventh light-blocking portion 47. The sixth light-blocking portion 46 is located in the display region AA. The sixth light-blocking portion 46 includes a third aperture 460. The color filter 11 is at least partially located in the third aperture 460. The seventh light-blocking portion 47 is located in the non-display region NA. Exemplarily, the sixth light-blocking portion 46 and the seventh light-blocking portion 47 include a light-absorbing material. Optionally, the light-absorbing material includes shading resin.

In an embodiment of the present disclosure, the sixth light-blocking portion 46 and the seventh light-blocking portion 47 may be reused as the planarization layer. Optionally, the planarization layer may be the first insulating layer 61 in FIG. 2, FIG. 10 and FIG. 11. This simplifies the film layer structure in the display panel, reduces the thickness of the display panel, and simplifies the manufacturing process of the display panel.

Optionally, the sixth light-blocking portion 46 and the seventh light-blocking portion 47 may be made of a same material, and formed in a same patterning process.

Exemplarily, as shown in FIG. 1, FIG. 2, FIG. 3, FIG. 10, FIG. 11 and FIG. 12, the display panel further includes a cover plate 6, a sealant 7, and a support portion 8. In response to assembly of the array substrate 1 and the cover plate 6, the cover plate 6 and the color filter 11 are separated In an embodiment of the present disclosure. This reduces the requirement on an alignment accuracy between the array substrate 1 and the cover plate 6.

Optionally, as shown in FIG. 1, FIG. 2, FIG. 3 and FIG. 10, the support portion 8 is located between the cover plate 6 and the array substrate 1. Orthographic projection of the support portion 8 on the plane of the substrate 10 at least partially overlaps with orthographic projection of the first transistor 13 on the plane of the substrate 10. After the array substrate 1 is aligned at the cover plate 6, the support portion 8 is configured to maintain a thickness between the array substrate 1 and the cover plate 6. In an embodiment of the present disclosure, the orthographic projection of the support portion 8 on the plane of the substrate 10 at least partially overlaps with the orthographic projection of the first transistor 13 on the plane of the substrate 10. This can prevent the support portion 8 from affecting deflection of liquid crystals in a sub-pixel aperture region, and ensure the display effect of the display panel.

Exemplarily, the pixel electrode 12 and the common electrode 51 include transparent conductive oxide. The transparent conductive oxide includes ITO or IZO.

It is to be noted that FIG. 1, FIG. 2, FIG. 3, FIG. 8, FIG. 9 and FIG. 10 only schematically shows that the pixel electrode 12 is located at a side of the common electrode 51 adjacent to the substrate 10. In an embodiment of the present disclosure, there are no limits made on a relative positional relationship between the pixel electrode 12 and the common electrode 51 and shapes of the pixel electrode and the common electrode. For example, In an embodiment of the present disclosure, according to different requirements, the pixel electrode 12 and the common electrode 51 can be designed as structures corresponding to different display modes. Exemplarily, the display modes include any one of an advanced super dimension switch (ADS) mode, a high advanced super dimension switch (HADS) display mode, a VA twisted nematic (TN) display mode, an in-plane switching (IPS) display mode, and a fringe field switching (FFS) display mode.

Optionally, as shown in FIG. 1, FIG. 3, FIG. 5, FIG. 9, FIG. 11 and FIG. 12, the array substrate 1 further includes a first protective layer LS1. Orthographic projection of the first protective layer LS1 on the plane of the substrate 10 overlaps with orthographic projection of the channel region 1330 of the first semiconductor layer 133 on the plane of the substrate 10. The first protective layer LS1 is located at a side of the first semiconductor layer 133 adjacent to the substrate 10. The first protective layer LS1 can absorb or reflect light coming from a backside of the display panel and emitted to the first semiconductor layer 133, such that the light from the backside does not irradiate the channel region 1330 of the first semiconductor layer 133, and the first transistor 13 is turned on or off accurately.

Exemplarily, as shown in FIG. 11 and FIG. 12, the first protective layer LS1 and the second gate 140 may be provided in the same fourth conductive layer M4 In an embodiment of the present disclosure.

Optionally, as shown in FIG. 1, FIG. 2, FIG. 3, FIG. 10, FIG. 11 and FIG. 12, the array substrate 1 further includes a second protective layer LS2. Orthographic projection of the second protective layer LS2 on the plane of the substrate 10 overlaps with orthographic projection of a channel region of the second semiconductor layer 143 on the plane of the substrate 10. The second protective layer LS2 is located at a side of the second semiconductor layer 143 adjacent to the substrate 10. The second protective layer LS2 can absorb or reflect light coming from the backside of the display panel and emitted to the second semiconductor layer 143, such that the light from the backside does not irradiate the channel region of the second semiconductor layer 143, and the second transistor 14 is turned on or off accurately.

Optionally, as shown in FIG. 1 and FIG. 3, the first protective layer LS1 and the second protective layer LS2 may be provided in a same layer In an embodiment of the present disclosure.

Figure 13:
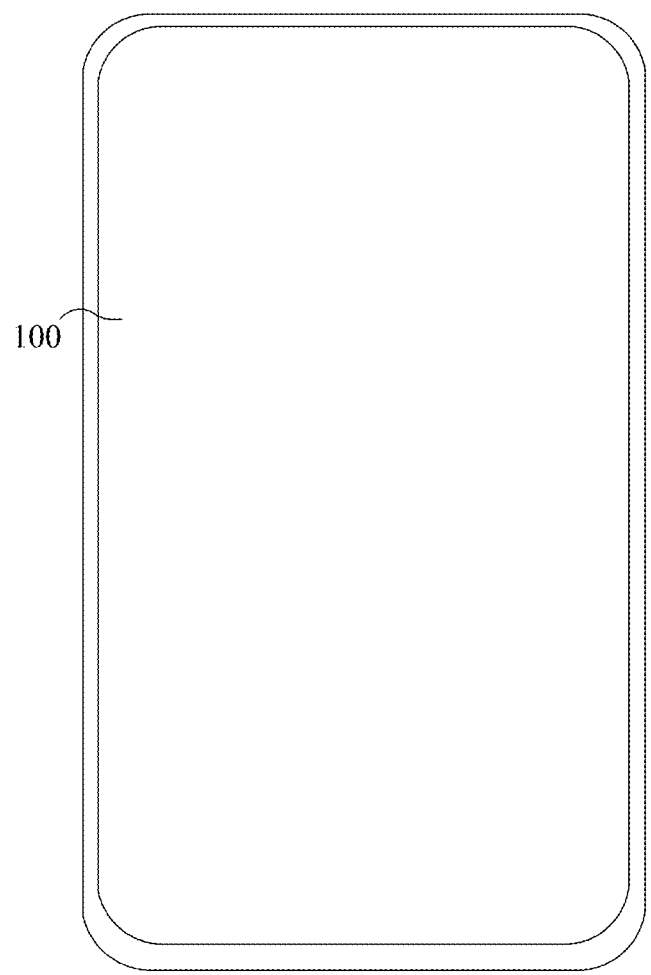
FIG. 13 is a schematic view of a display apparatus according to an embodiment of the present disclosure.

An embodiment of the present disclosure further provides a display apparatus. FIG. 13 is a schematic diagram of a display apparatus according to an embodiment of the present disclosure. As shown in FIG. 13, the display apparatus includes the foregoing display panel 100. A specific structure of the display panel 100 has been described in detail in the foregoing embodiments, and is not repeated herein. Certainly, the display apparatus shown in FIG. 13 is for schematic description only. The display apparatus may be any electronic device with a display function, such as a mobile phone, a tablet computer, a notebook computer, an ebook, or a television.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A display panel comprising:
an array substrate comprising:
a substrate; and
a display region comprising:
a color filter;
a pixel electrode; and
a first transistor,
wherein the color filter, the pixel electrode, and the first transistor are located on a same side of the substrate;
wherein the first transistor comprises a first semiconductor layer;
wherein, along a direction perpendicular to a plane of the substrate, the color filter is located between the first semiconductor layer and the pixel electrode, and the first semiconductor layer is electrically connected to the pixel electrode through a first connecting portion; the first connecting portion comprises a first connecting sub-portion in a first connecting hole and a first connecting electrode;
wherein an orthographic projection of the first connecting sub-portion on the plane of the substrate does not overlap with orthographic projection of the color filter on the plane of the substrate; and, along a direction parallel to the plane of the substrate, the first connecting sub-portion at least partially overlaps with the color filter;
wherein the array substrate further comprises a first light-blocking portion in the display region;
wherein the first light-blocking portion comprises a first light-blocking sub-portion extending along a first direction; the first light-blocking sub-portion is located between two adjacent color filters in a second direction; the first direction intersects with the second direction; and along the direction perpendicular to the plane of the substrate, the first connecting electrode does not overlap with the first light-blocking sub-portion; and
wherein the array substrate further comprises a first film layer; the first film layer comprises a first portion and a second portion that are insulated from each other; the first portion comprises the first light-blocking sub-portion; and the second portion comprises the first connecting electrode.

2. The display panel according to claim 1, wherein the first connecting portion further comprises a second connecting sub-portion in a second connecting hole; along the direction perpendicular to the plane of the substrate, the first connecting electrode is located between the first connecting hole and the second connecting hole, and the first connecting sub-portion is electrically connected to the first connecting electrode and the pixel electrode; and the second connecting sub-portion is electrically connected to the first connecting electrode and the first semiconductor layer.

3. The display panel according to claim 1, wherein the first light-blocking portion further comprises a second light-blocking sub-portion extending along the second direction; and the second light-blocking sub-portion is located between two adjacent color filters in the first direction; and
wherein, along the direction perpendicular to the plane of the substrate, the first connecting electrode at least partially overlaps with the second light-blocking sub-portion.

4. The display panel according to claim 3, wherein the second light-blocking sub-portion is electrically connected to a source or a drain of the first transistor, and the second light-blocking sub-portion is configured to provide a data signal for the first transistor.

5. The display panel according to claim 3, wherein the second light-blocking sub-portion is located between the first connecting electrode and the first semiconductor layer; and wherein the second light-blocking sub-portion comprises a first sub-hole, and orthographic projection of the first connecting electrode on the plane of the substrate at least partially overlaps with the first sub-hole.

6. The display panel according to claim 1, wherein the first light-blocking portion further comprises a second light-blocking sub-portion extending along the second direction; and the second light-blocking sub-portion is located between two adjacent color filters in the first direction;

wherein, along the direction perpendicular to the plane of the substrate, orthographic projection of the first connecting electrode on the plane of the substrate does not overlap with orthographic projection of the second light-blocking sub-portion on the plane of the substrate; and wherein the first film layer further comprises a third portion insulated from the second portion, and the third portion comprises the second light-blocking sub-portion.

7. The display panel according to claim 2, wherein the array substrate further comprises a non-display region; the non-display region comprises a second light-blocking portion; the second light-blocking portion comprises a third light-blocking sub-portion; and the third light-blocking sub-portion comprises a light-absorbing material;

wherein the array substrate further comprises a common electrode and a common connecting line in the non-display region; and the common electrode is electrically connected to the common connecting line through a second connecting portion; and wherein the second connecting portion comprises a third connecting sub-portion in a third connecting hole; an orthographic projection of the third connecting sub-portion on the plane of the substrate does not overlap with orthographic projection of the third light-blocking sub-portion on the plane of the substrate; and along the direction parallel to the substrate, the third connecting sub-portion at least partially overlaps with the third light-blocking sub-portion.

8. The display panel according to claim 7, wherein the second connecting portion further comprises a second connecting electrode electrically connected to the common connecting line and the third connecting sub-portion, and the second connecting electrode is located between the third connecting hole and the common connecting line.

9. The display panel according to claim 8, wherein the second light-blocking portion further comprises a fourth light-blocking sub-portion, and the fourth light-blocking sub-portion comprises the second connecting electrode.

10. The display panel according to claim 1, wherein the display region further comprises a cover plate and a support portion; and the support portion is located between the cover plate and the array substrate; and wherein an orthographic projection of the support portion on the plane of the substrate at least partially overlaps with an orthographic projection of the first transistor on the plane of the substrate.

11. A display apparatus, comprising a display panel, wherein the display panel, comprises an array substrate, wherein the array substrate comprises a substrate and has a display region; wherein the display region comprises a color filter, a pixel electrode, and a first transistor that are located on a same side of the substrate;

wherein the first transistor comprises a first semiconductor layer;

wherein, along a direction perpendicular to a plane of the substrate, the color filter is located between the first semiconductor layer and the pixel electrode, and the first semiconductor layer is electrically connected to the pixel electrode through a first connecting portion; the first connecting portion comprises a first connecting sub-portion in a first connecting hole and a first connecting electrode;

wherein an orthographic projection of the first connecting sub-portion on the plane of the substrate does not overlap with orthographic projection of the color filter on the plane of the substrate; and, along a direction parallel to the plane of the substrate, the first connecting sub-portion at least partially overlaps with the color filter;

wherein the array substrate further comprises a first light-blocking portion in the display region;

wherein the first light-blocking portion comprises a first light-blocking sub-portion extending along a first direction; the first light-blocking sub-portion is located between two adjacent color filters in a second direction; the first direction intersects with the second direction; and along the direction perpendicular to the plane of the substrate, the first connecting electrode does not overlap with the first light-blocking sub-portion; and wherein the array substrate further comprises a first film layer; the first film layer comprises a first portion and a second portion that are insulated from each other; the first portion comprises the first light-blocking sub-portion; and the second portion comprises the first connecting electrode.

* * * * *